United States Patent [19]
Anderson

[11] Patent Number: 5,345,875
[45] Date of Patent: Sep. 13, 1994

[54] GAS GENERATOR
[75] Inventor: Steven J. Anderson, Willis, Mich.
[73] Assignee: Automotive Systems Laboratory, Inc., Farmington Hills, Mich.
[21] Appl. No.: 87,985
[22] Filed: Jul. 7, 1993
[51] Int. Cl.⁵ .................................. C06D 5/00
[52] U.S. Cl. ..................... 102/530; 102/443; 280/741; 422/165
[58] Field of Search ............... 102/443, 530, 531; 280/741; 422/164–167

[56] References Cited
U.S. PATENT DOCUMENTS

| | | | |
|---|---|---|---|
| 34,615 | 3/1862 | Shannon | 102/443 |
| 2,529,791 | 11/1950 | Whitworth et al. | 102/530 |
| 3,726,220 | 4/1973 | MacDonald et al. | 102/530 |
| 3,797,854 | 3/1974 | Poole et al. | 280/741 |
| 4,530,516 | 7/1985 | Adams et al. | 280/741 |
| 5,009,855 | 4/1991 | Nillson | 102/530 |

Primary Examiner—Harold J. Tudor
Attorney, Agent, or Firm—Lyman R. Lyon

[57] ABSTRACT

A gas generator comprises a propellant container having a plurality of propellant grains therein, an igniter for igniting the propellant grains, and a shock wave barrier disposed in closely spaced relation to the igniter for attenuating a shock wave emanating therefrom so as to preclude fragmentation of the propellant grains.

1 Claim, 2 Drawing Sheets

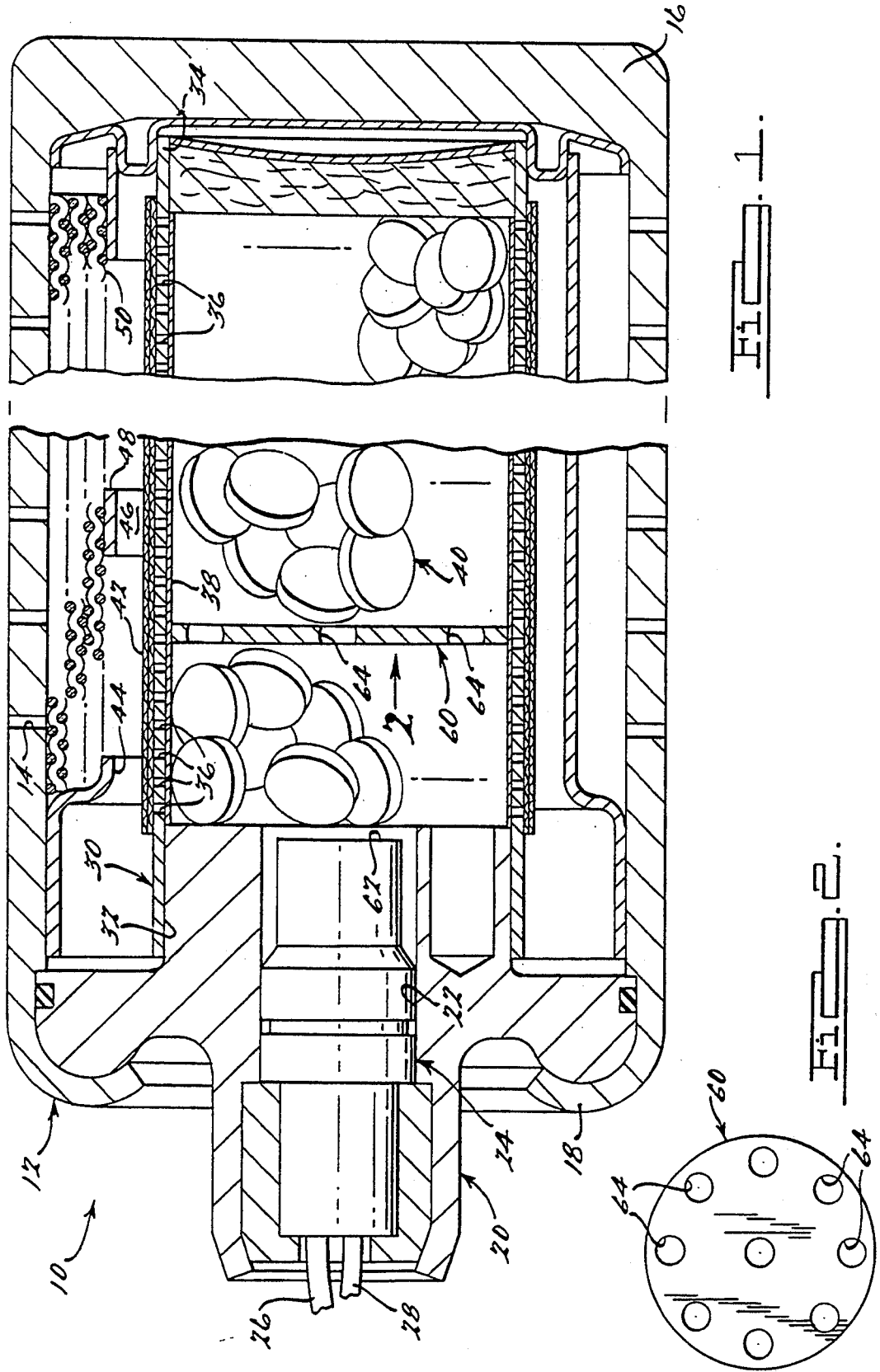

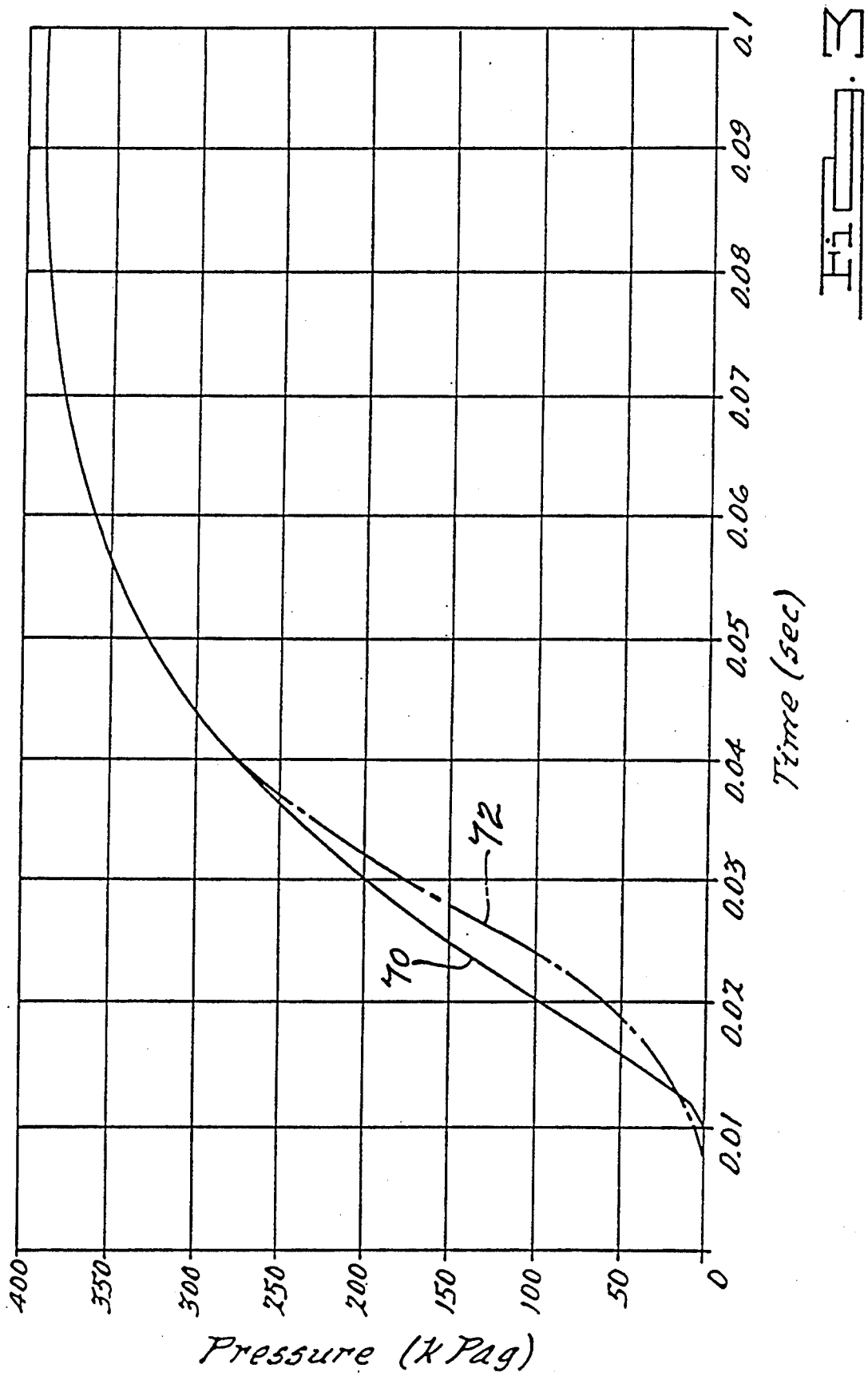

5,345,875

GAS GENERATOR

BACKGROUND OF THE INVENTION

The onset rate of pressurization of an automobile airbag is subject to strict requirements to avoid injury to an out of position vehicle occupant. An aggressive, uncontrolled onset rate of pressurization is undesirable since excessively rapid inflation of the air bag may impact against the occupant. Essential to the concept of the present invention is the discovery that propellant grains adjacent to the igniter of the inflator are susceptible to crushing or fragmentation due to a shock wave developed by the igniter resulting in a significant increase in the onset rate of gas production.

SUMMARY OF THE INVENTION

The aforesaid problem is solved, in accordance with the present invention, by utilizing a shock wave barrier in closely spaced relation to the igniter that attenuates the shock wave so as to minimize crush or fragmentation of the propellant grains without introducing time lapse to first gas production.

BRIEF DESCRIPTION OF THE DRAWINGS

FIG. 1 is a cross-sectional view of an inflator having the shock wave barrier of the invention;

FIG. 2 is a view taken in the direction of the arrow 2 of FIG. 1; and

FIG. 3 is a graph of comparative inflator pressure curves.

DETAILED DESCRIPTION OF THE PREFERRED EMBODIMENT

As seen in the drawings, a gas generator or inflator 10 for an automobile airbag, in accordance with an exemplary constructed embodiment of the invention, comprises a housing 12, for example, an aluminum forging provided with a plurality of gas discharge orifices 14. The housing 12 has an integral closure 16 at one end and is open at the opposite end 18 for the acceptance of an end closure 20. The end closure 20 has a central bore 22 for the acceptance of a conventional igniter 24. The igniter 24 is provided with a pair of electrical conductors 26 and 28 to facilitate electric ignition of an explosive charge contained therein.

A cylindrical propellant tube 30 has one end portion 32 supported on the end closure 20 and an opposite end portion 34 supported by the closed end portion 16 of the housing 12.

The propellant tube 30 is provided with a plurality of relatively small apertures 36 such that approximately 25-40% of the tube 30 is open. The apertures 36, in the constructed embodiment of the invention, are 1.6 mm ($\approx$.063 in) in diameter. The inside of the propellant tube 30 is provided with a burst foil 38 which controls pressure buildup and flame front propagation through a plurality of propellant grains 40 disposed internally of the propellant tube 30.

The propellant tube 30 is surrounded by a slagging screen 42 comprising one or more layers of 20 mesh wire having a wire diameter of 0.58 mm ($\approx$0.023 in). A baffle tube 44 is telescoped about the propellant tube 30 in radially spaced relation to the slagging screen 42 thereon, so as to define a plenum 46 radially outwardly from the screen 42. The baffle tube 44 is provided with a plurality of relatively large apertures 48 and is surrounded by a final filter screen 50.

Gases generated by the propellant 40 exit from the propellant tube 30 through the apertures 36 therein, pass through the slagging screen 42 and enter the plenum 46 defined by the space between the slagging screen 42 and the radially inner wall of the baffle tube 44. Thereafter, the gases flow radially outwardly through the apertures 48 in the baffle tube 44 and final filter screen 50 to exit through the orifices 14 in the housing 12. It is to be noted that conventional propellant grains 40 have dimensions of 9.53 mm ($\approx$0.375 in) diameter by 3.3 mm ($\approx$0.13 in) thick. The average crush strength of the propellant grains 40 is approximately 20 kPag (2.9 psig).

I have discovered conventional propellant grains 40 of the aforesaid dimension may be fragmented or crushed by a shock wave from the igniter 24. When the propellant grains 40 are reduced to relatively small particles by crushing, combustion is accelerated resulting in a rapid and sometimes uncontrolled and excessive pressure rise.

In accordance with the present invention, the aforesaid problem is solved by introducing a shock wave barrier 60 in closely spaced relation to the igniter 24, for example 10-50 mm from the exit nozzle 62 of igniter 24. The barrier 60 has a plurality of apertures 64 therein that permit passage of a flame front yet attenuate the shock wave produced by the igniter 24 thereby gases produced by combustion of the propellant grains 40 while maintaining ignition efficiency.

As seen in FIG. 3, excessive rise of airbag inflation pressure in the first 30 milliseconds is illustrated by curve 70. This rapid pressure rise is caused by crushing of the propellant grains 40 and the resultant high combustion gas onset rate. However, and in accordance with the present invention, when the shock wave barrier 60 is utilized in the first 25-75 mm ($\approx$0.98-2.95 in) of the propellant tube 30, crush of the propellant grains 40 is minimized resulting in a desirable "low onset" curve as illustrated by curve 72 without delaying the initiation of propellant burn.

While the preferred embodiment of the invention has been disclosed, it should be appreciated that the invention is susceptible of modification without departing from the scope of the following claims.

I claim:

1. A gas generator comprising:
   an elongated cylindrical housing having a central axis and a plurality of gas discharge apertures spaced longitudinally in a side wall thereof;
   an elongated cylindrical propellant tube in said housing in coaxial relation thereto and having a plurality of longitudinally spaced apertures in a sidewall thereof and an open end;
   a cylindrical igniter at one end of said housing for igniting a propellant and having a central axis coaxially related to the axis of said housing and a discharge end aligned with and communicating with the open end of said propellant tube;
   a propellant charge in said propellant tube comprising a plurality of propellant grains; and
   a circular shock wave attenuation disc in said propellant tube disposed within said propellant grains so as to divide said grains into first and second longitudinally spaced portions, said shock wave attenuation disc being spaced from the discharge end of said igniter from approximately 10 mm to approximately 50 mm and extending at a right angle to the central axis of said housing, said shock wave attenuation disc having a plurality of apertures therein extending parallel to the axis of said housing in a radially dispersed array whereby a flame front emanating from said igniter is free to move through the first portion of said propellant grains, thence through the apertures in said shock wave disc, thence through the second portion of said propellant grains but a shock wave emanating from said igniter is attenuated by said shock wave attenuation disc to preclude fragmentation of the second portion of said propellant grains.

* * * * *